US012757906B2

(12) United States Patent
Umeda et al.

(10) Patent No.: US 12,757,906 B2
(45) Date of Patent: Oct. 13, 2026

(54) DEVICE FOR CLAMPING BONE-IN MEAT

(71) Applicant: MAYEKAWA MFG. CO., LTD., Tokyo (JP)

(72) Inventors: Seiichiro Umeda, Tokyo (JP); Takeshi Chimura, Tokyo (JP); Ryuji Kodama, Tokyo (JP); Kenichi Oka, Tokyo (JP)

(73) Assignee: MAYEKAWA MFG. CO., LTD., Tokyo (JP)

( * ) Notice: Subject to any disclaimer, the term of this patent is extended or adjusted under 35 U.S.C. 154(b) by 0 days.

(21) Appl. No.: 19/113,317

(22) PCT Filed: Sep. 21, 2023

(86) PCT No.: PCT/JP2023/034290
§ 371 (c)(1),
(2) Date: Mar. 19, 2025

(87) PCT Pub. No.: WO2024/063139
PCT Pub. Date: Mar. 28, 2024

(65) Prior Publication Data

US 2026/0096566 A1 Apr. 9, 2026

(30) Foreign Application Priority Data

Sep. 21, 2022 (JP) ................................ 2022-150206

(51) Int. Cl.
*A22C 17/02* (2006.01)
*A22C 21/00* (2006.01)
(Continued)

(52) U.S. Cl.
CPC .......... *A22C 17/02* (2013.01); *A22C 21/0046* (2013.01); *A22C 21/0076* (2013.01);
(Continued)

(58) Field of Classification Search
CPC ..... A22B 5/0035; A22C 17/004; A22C 17/02; A22C 17/04; A22C 21/0046; A22C 21/0069; A22C 21/0076; A22C 21/0084
(Continued)

(56) References Cited

U.S. PATENT DOCUMENTS 3,194,599 A * 7/1965 Ambill .................. A22B 7/002
294/81.61
3,326,138 A * 6/1967 Thomas ................ A22B 7/003
104/93
(Continued)

FOREIGN PATENT DOCUMENTS

CN 104427880 A 3/2015
CN 207710809 U 8/2018
(Continued)

OTHER PUBLICATIONS

International Search Report Issued in Corresponding PCT Application No. PCT/JP2023/034290, dated Nov. 28, 2023 (6 Pages with English Translation).
(Continued)

*Primary Examiner* — David J Parsley
(74) *Attorney, Agent, or Firm* — Osha Bergman Watanabe & Burton LLP

(57) ABSTRACT

A device for clamping bone-in meat includes a plurality of gripping blocks, and a displacement restricting part. The gripping blocks have grip parts that can abut an outer circumferential surface around a bone section of bone-in meat, and that are provided to be displaceable in a direction in which the grip parts approach and separate from each other. The displacement restricting part restricts displacement of the plurality of gripping blocks, which are gripping the bone-in meat, in a separating direction.

4 Claims, 9 Drawing Sheets

(51) Int. Cl.
*A22B 5/00* (2006.01)
*A22C 17/00* (2006.01)

(52) U.S. Cl.
CPC ........... *A22B 5/0035* (2013.01); *A22C 17/004* (2013.01); *A22C 21/0069* (2013.01)

(58) Field of Classification Search
USPC .......................................... 452/135, 136, 167
See application file for complete search history.

(56) References Cited

U.S. PATENT DOCUMENTS

| | | | | |
|---|---|---|---|---|
| 5,203,736 | A | 4/1993 | Schulte et al. | |
| 5,462,477 | A | 10/1995 | Ketels | |
| 5,666,758 | A * | 9/1997 | Vaillier .................. | A01K 97/24 294/110.1 |
| 6,106,384 | A | 8/2000 | Mutoh et al. | |
| 7,059,954 | B2 * | 6/2006 | Annema ............ | A22C 21/0092 452/136 |
| 9,763,459 | B2 | 9/2017 | Hazenbroek | |
| 10,130,107 | B2 * | 11/2018 | Winkelmolen .... | A22C 21/0053 |
| 10,993,447 | B2 * | 5/2021 | Kido ...................... | A22C 17/02 |
| 2015/0173376 | A1 * | 6/2015 | Janssen .................. | A22B 7/005 452/187 |
| 2016/0021902 | A1 | 1/2016 | Winkelmolen | |
| 2016/0029650 | A1 | 2/2016 | Hazenbroek | |
| 2019/0373904 | A1 | 12/2019 | Chimura et al. | |
| 2022/0151248 | A1 | 5/2022 | Jensen | |
| 2022/0312781 | A1 | 10/2022 | Kido et al. | |

FOREIGN PATENT DOCUMENTS

| | | | |
|---|---|---|---|
| CN | 110178879 | A | 8/2019 |
| EP | 0594934 | A2 | 5/1994 |
| JP | H05153902 | A | 6/1993 |
| JP | H06284854 | A | 10/1994 |
| JP | H11056226 | A | 3/1999 |
| JP | H11103764 | A | 4/1999 |
| JP | 5331244 | B2 | 10/2013 |
| JP | 2015-522274 | A | 8/2015 |
| JP | 2021-177710 | A | 11/2021 |
| TW | 201934009 | A | 9/2019 |
| TW | 202420998 | A | 6/2024 |
| WO | 2014-007607 | A1 | 1/2014 |

OTHER PUBLICATIONS

Office Action Issued in Coresponding Taiwan Application No. 112136078, dated Oct. 7, 2024 (13 Pages with English Translation).
European Search Report issued in Corresponding Application No. EP23868260.3, dated Dec. 22, 2025. (5 pages).
Office action issued in the counterpart Chinese application No. 202380067122.X, mailed Jan. 30, 2026 (18 pages).

* cited by examiner

DEVICE FOR CLAMPING BONE-IN MEAT

TECHNICAL FIELD

The present invention relates to a device for clamping bone-in meat.

Priority is claimed on Japanese Patent Application No. 2022-150206, filed Sep. 21, 2022, the content of which is incorporated herein by reference.

BACKGROUND ART

In recent years, a meat section deboning device has been developed to separate meat sections from bone-in meat such as pigs, chickens, or the like (for example, see Patent Document 1).

In such a meat section deboning device, an end portion of the bone section of the bone-in meat (for example, the ankle) is gripped by a clamping device, and the bone-in meat is then transported to various processing stations for various processing steps in this state. For example, in a meat section deboning processing station, slit forming along the bone section is performed with respect to the bone-in meat, in which the ankle is gripped with a clamping device, by a slit forming blade, and then, the meat section around the bone section is cut with a round blade, and the meat section is separated with a meat separator.

The clamping device, which grips the end portion of the bone section, has a bottom plate that is maintained in a substantially horizontal posture and to which a substantially U-shaped locking groove is provided, and the end portion of the bone section of the bone-in meat is locked. The end portion of the bone section of the bone-in-meat, such as an ankle or the like, has an outer circumference in which the diameter becomes thicker toward a terminal part in an extending direction. The clamping device utilizes shape characteristics of the end portion of the bone section to lock the thicker part of the outer circumference of the bone section to left and right side edge portions of the locking groove.

CITATION LIST

Patent Document

Patent Document 1: Japanese U.S. Pat. No. 5,331,244

SUMMARY OF INVENTION

Technical Problem

However, in the conventional clamping devices described above, since a groove width of the locking groove that locks the end portion of the bone section is constant, the width of the locking groove is determined to be substantially the same as the average outer diameter of the end portion of the bone section of the bone-in meat being processed. For this reason, if there is a large variation in thickness of the bone section (the end portion of the bone sections) of the bone-in meat being processed, it will not be possible to treat the bone-in meat using the same clamping device. That is, when the thickness of the end portion of the bone section is too thick compared to the groove width of the locking groove, the end portion of the bone section cannot be locked into the locking groove, and when the thickness of the end portion of the bone section is too thin compared to the groove width of the locking groove, the end portion of the bone section will fall out from the locking groove.

For this reason, when processing the bone-in meat with large variations in thickness at the end portion of the bone section, it was necessary to prepare a plurality of clamping devices with different widths of the locking groove and to exchange the clamping device depending on the thickness of the end portion of the bone section.

The problem to be solved is to provide a device for clamping bone-in meat capable of reliably gripping bone-in meat even if there is variation in thickness of an end portion of a bone section of bone-in meat.

Solution to Problem

A device for clamping bone-in meat according to an aspect of the present invention includes a plurality of gripping blocks having grip parts that are able to abut an outer circumferential surface around a bone section of bone-in meat and that are provided to be displaceable in a direction in which the grip parts approach and separate from each other; and a displacement restricting part configured to restrict displacement of the plurality of gripping blocks, which are gripping the bone-in meat, in a separating direction.

When the bone-in meat is held by the clamping device with the above configuration, the grip parts of the plurality of gripping blocks are displaced in the separating direction, and an end portion of the bone section of the bone-in meat, such as an ankle or the like, is inserted between the grip parts of the plurality of gripping blocks. In this state, the displacement restricting part restricts the displacement in the separating direction of the plurality of gripping blocks. Further, in the specification, the term "bone section" includes bones having parts of other organizations, such as skin or flesh, attached to their outer surface.

As a result, even if there is variation in thickness of the bone-in meat around the bone section, the clamping device makes it possible to grip the bone-in meat reliably.

The pair of gripping blocks may include: clamping parts that have the grip parts on side edge portions of the clamping parts facing each other and that are configured to clamp the outer circumferential surface of the bone-in meat in a substantially horizontal posture; and arm parts extending upward from the clamping parts, at least one of the arm parts being able to pivot about a pivoting axis so as to be displaced in a direction in which the grip parts of the pair of gripping blocks approach and separate from each other.

In this case, by pivoting the arm part of at least one of the gripping blocks about the pivoting axis, it becomes possible to move the clamping part of at least one of the gripping blocks away from the clamping part of the other gripping block while increasing a tilt angle. Accordingly, when the end portion of the bone section, such as the ankle or the like made of bone-in meat, is gripped by the gripping block, the volume of the space part that receives the upper bone section of the two clamping parts enlarges. As a result, this makes it possible to easily set one end side of the bone section between the two clamping parts. In addition, when the two clamping parts are displaced in the approaching direction, the two clamping parts become a substantially horizontal posture, enabling the grip parts to firmly grip one end side of the bone section.

Each of the arm parts of the pair of gripping blocks may be pivotable about the pivoting axis.

In this case, by pivoting each of the pair of gripping blocks about the pivoting axis, it is possible to tilt the two clamping parts while increasing the separating distance between them. For this reason, when gripping the end portion of the bone section, such as the ankle or the like of the bone-in meat, in the gripping block, it becomes easier to set the end portion of the bone section at upper side of the two clamping parts. In addition, here, since the tilt angles of the pair of gripping blocks can be made almost the same, it becomes possible to support the bone-in meat in a well-balanced manner with the two gripping blocks.

A guide protrusion extending parallel with the pivoting axis may be provided on each of the arm parts of the pair of gripping blocks, the displacement restricting part may include a displacement restricting block having a displacement restricting groove that is able to abut the two guide protrusions, and the displacement restricting block may be disposed so as to be displaceable in a direction along the displacement restricting groove, and a groove width of the displacement restricting groove narrows toward one side.

In this case, in a state in which the pair of gripping blocks grips the bone-in meat, when the displacement restricting groove of the displacement restricting block abuts against the guide protrusions of the pair of gripping blocks, the displacement in the separating direction of the pair of gripping blocks is restricted by the displacement restricting block. Here, when the displacement restricting block is displaced so that a side of the displacement restricting groove, a groove width of which narrows, approaches the two guide protrusions, the width of the gripping parts of the pair of gripping blocks narrows, and the bone section of the bone-in meat becomes firmly gripped by the pair of gripping blocks. Accordingly, when the configuration is employed, although it has a simple structure, it is able to firmly grip the end portion of the bone section such as the ankle of the bone-in meat using the pair of gripping blocks.

The displacement restricting part may further include a biasing member configured to bias the displacement restricting block in a direction in which a side of the displacement restricting groove, a groove width of which narrows, approaches the two guide protrusions.

In this case, in a state in which the displacement restricting block is separated from the two guide protrusions, one end side of the bone-in meat is set between the pair of gripping blocks, and when the location restriction on the displacement restricting block is released in this state, the displacement restricting block is displaced by the biasing force of the biasing member. Here, the displacement restricting grooves in the displacement restricting block press the two guide protrusions in a direction in which they approach each other. As a result, the pair of gripping blocks receive the biasing force from the biasing member and press the outer circumferential surface of the bone-in-meat with a predetermined load.

The grip part may be constituted by a concave portion provided in the side edge portion of the clamping part.

In this case, since the pair of clamping parts abuts against the outer circumferential surface of the bone-in meat at the concave portion, the outer circumferential surface of the bone-in meat is stably gripped by the pair of gripping blocks.

The concave portion may be provided with a receiving part configured to receive the outer circumferential surface of the bone-in meat, and a tapered portion inclined from a side separated away from the receiving part toward a deepest portion of the concave portion.

In this case, when one end side of the bone-in meat is set between the pair of clamping parts and the pair of clamping parts are displaced in the approaching direction in this state, the outer circumferential surface of the bone-in meat is received by the receiving part of the concave portion and is subjected to a pressing force from the tapered portion of the concave portion. Since the tapered portion is inclined toward the most recent part of the concave portion, part of the pressing force that presses the clamping parts in the approaching direction can act as a component force that presses the bone-in meat in a direction of the receiving part. For this reason, the bone-in meat gripped by the clamping parts is held in a stable posture by the tapered portion in the concave portion and the receiving part.

The plurality of gripping blocks may have a first gripping block and a second gripping block in which the respective grip parts of the first gripping block and the second gripping block are able to approach and separate from each other, and the displacement restricting part may include a block biasing member configured to bias at least one of the first gripping block and the second gripping block in a direction in which the grip parts approach each other.

In this case, when holding the bone-in meat with the clamping devices, the interval between the gripping parts of the first gripping block and the second gripping block is expanded against the biasing force of the block biasing member, and the end portion of the bone section of the bone-in meat, such as an ankle or the like, is inserted between these gripping parts. In this way, when the end portion of the bone section, such as an angle of bone-in-meat, is inserted between the grip parts, the biasing force of the block biasing member increases in accordance with the increase in the opening amount between the grip parts, and the opening between the grip parts comes to be regulated by the biasing force of the block biasing member. As a result, even if there is variation in thickness of the bone-in meat around the bone section, the clamping device makes it possible to grip the bone-in meat reliably.

The first gripping block may be able to be fixed to external fixed equipment and is provided with a substantially horizontal pivot shaft configured to pivotably support the second gripping block, and the second gripping block may be supported on the pivot shaft such that gravity acts in a direction in which the grip part of the second gripping block approaches the grip part of the first gripping block.

In this case, when the end portion of the bone section, such as an ankle of bone-in-meat, is inserted between the grip parts, the interval between the gripping parts of the first gripping block and the second gripping block is expanded against the biasing force of the block biasing member. Here, the second gripping block pivots upward relative to the first gripping block, which is fixed to the external fixed equipment, about a substantially horizontal pivot shaft. When the second gripping block pivots upward about the pivot shaft, the weight of the second gripping block acts in a direction in which the grip part of the second gripping block approaches the grip part of the first gripping block. For this reason, when the interval between the grip parts of the first gripping block and the second gripping block is spread apart by the bone section of the bone-in meat such as the ankle, the weight of the second gripping block, in addition to the biasing force of the block biasing member, presses against the bone section of bone-in meat such as the ankle. Accordingly, when the configuration is employed, the end portion of the bone section such as the ankle of the bone-in meat can be more strongly gripped by the first gripping block and the second gripping block.

The second gripping block may include a connecting arm that is substantially extending toward the first gripping block and that is pivotably supported on the pivot shaft.

In this case, since the second gripping block is provided with the connecting arm that extends substantially horizontally toward the pivot shaft, the weight of the second gripping block acting on the center of gravity acts as a large moment to rotate the second gripping block in the gripping direction. Accordingly, when the configuration is employed, the first gripping block and the second gripping block make it possible to grip the end portion of a bone section, such as an ankle, more firmly.

The block biasing member may be disposed on a side portion of the second gripping block which is an opposite side of the second gripping block where the connecting arm is extending.

In this case, since the block biasing member and its support portion are positioned farther away from the pivot shaft, their weight acts as a larger moment to rotate the second gripping block in the gripping direction. For this reason, while preventing the block biasing member from becoming too large, the grip parts of both the gripping blocks make it possible to more firmly fix the end portions of bone sections, such as the ankle of bone-in meat.

The block biasing member may be a compression coil spring disposed substantially in a tangential direction of a circle about a center axis of the pivot shaft.

In this case, this enables the biasing force (spring reaction force) of the compression coil spring to be applied efficiently to the second gripping block. In addition, when gripping the bone section of the bone-in meat, the reaction force of the block biasing member (compression coil spring) acts as a compressive load on the bone section, so the block biasing member is no longer subjected to a load in the fracture direction. For this reason, durability of the block biasing member is further increased.

In addition, since it is now possible to dispose the compression coil spring along the side of the second gripping block which is an opposite side of the second gripping block where the connecting arm is extending, the entire clamping device can be made more compact.

Advantageous Effects of Invention

Since the device for clamping bone-in meat according to the aspect of the present invention includes the plurality of gripping blocks configured to adjust the separating distance of the grip part, and the displacement restricting part configured to restrict displacement of the plurality of gripping blocks in the separating direction, even if there is variation in the thickness of the end portion of the bone section, such as the ankle, the bone-in meat can be gripped reliably.

DESCRIPTION OF EMBODIMENTS

Hereinafter, embodiments of the present invention will be described with reference to the accompanying drawings. Further, materials, shapes, relative arrangements, or the like, of components described in the following embodiments do not limit the scope of the present invention unless the context indicates otherwise.

First Embodiment

Figure 1:
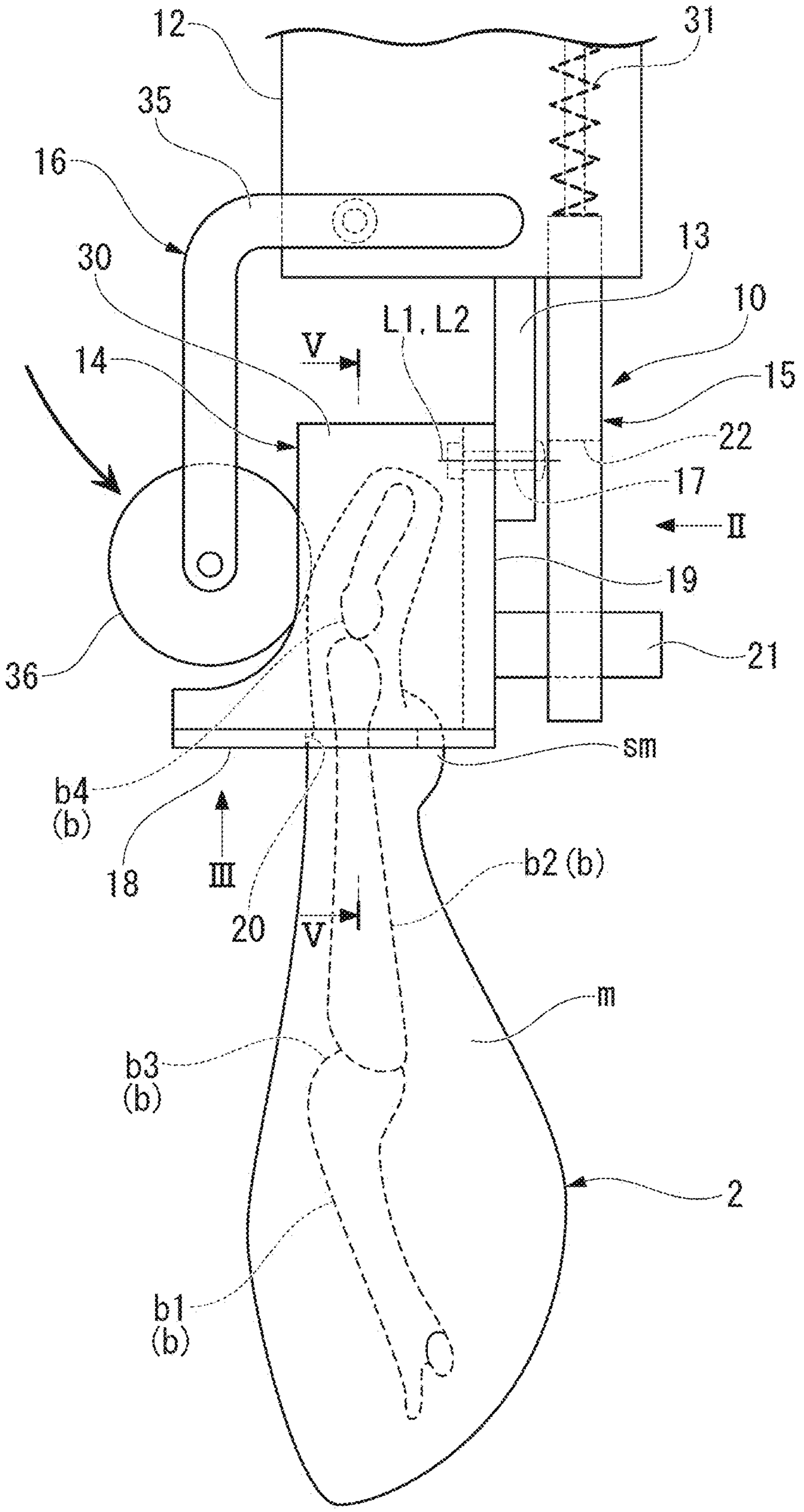
FIG. 1 is a side view of a device for clamping bone-in meat of a first embodiment.
Figure 2:
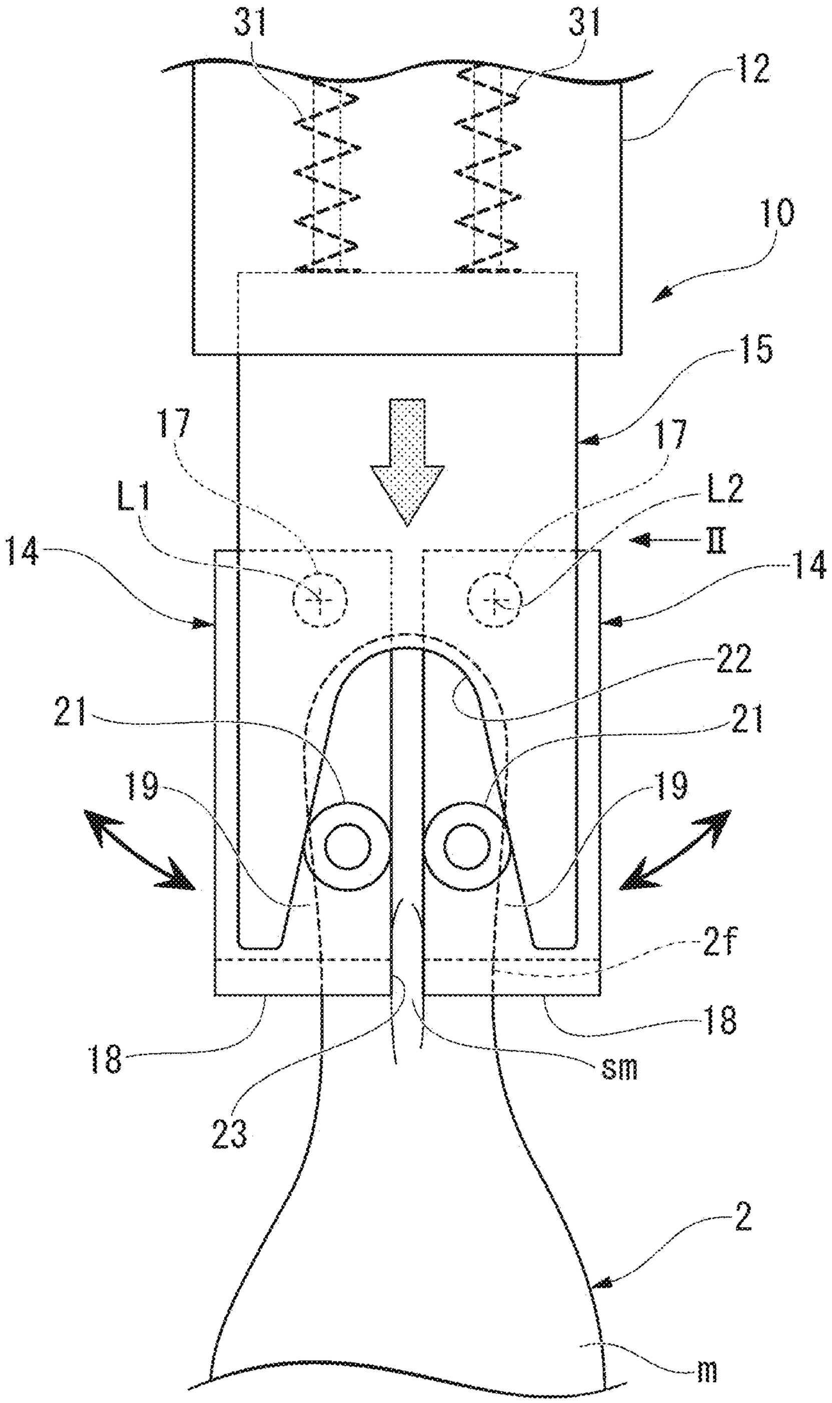
FIG. 2 is a view of the device for clamping bone-in meat of the first embodiment when seen from an arrow II in FIG. 1.
Figure 3:
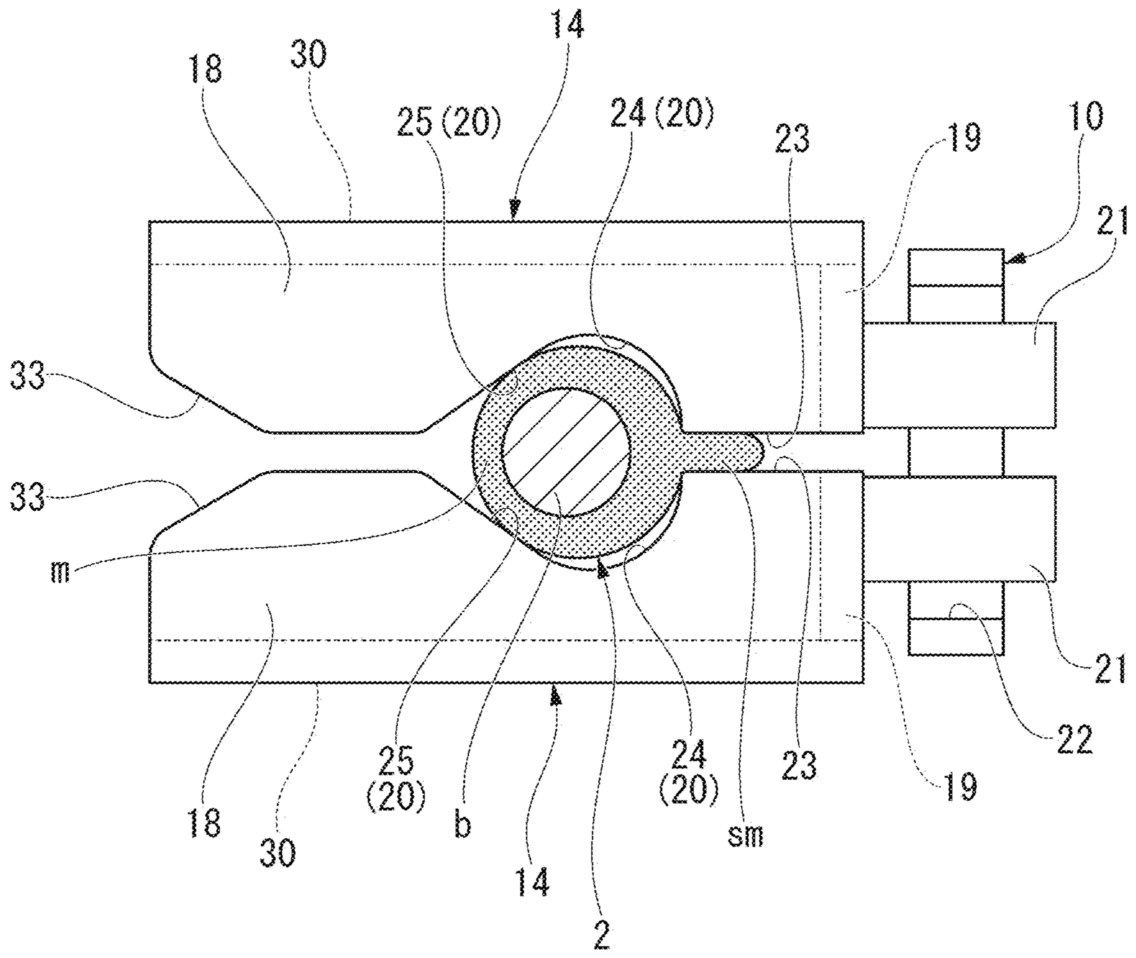
FIG. 3 is a view of the device for clamping bone-in meat of the first embodiment when seen from an arrow III in FIG. 1.
Figure 4:
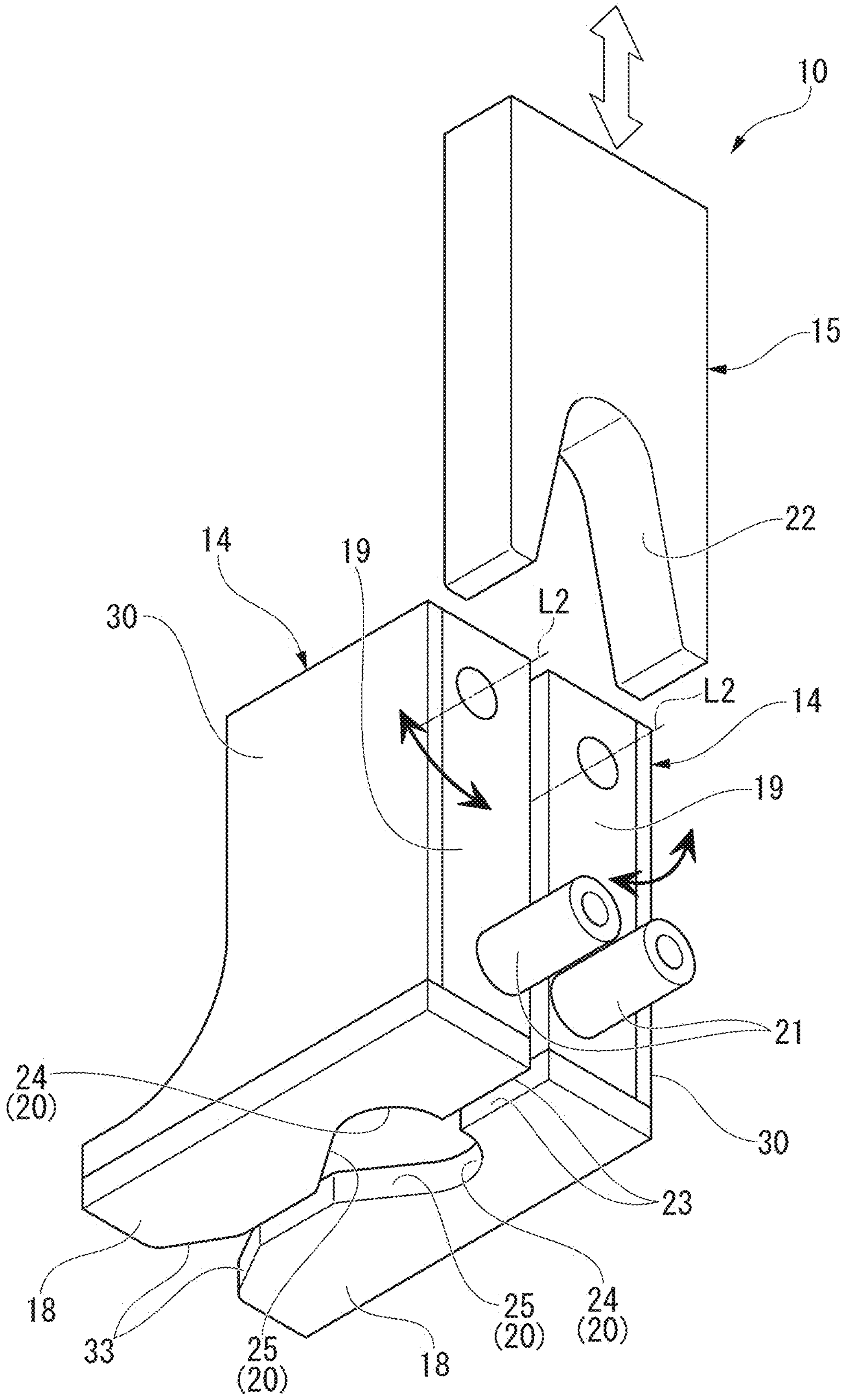
FIG. 4 is an exploded perspective view of a part of the device for clamping bone-in meat of the first embodiment.
Figure 5:
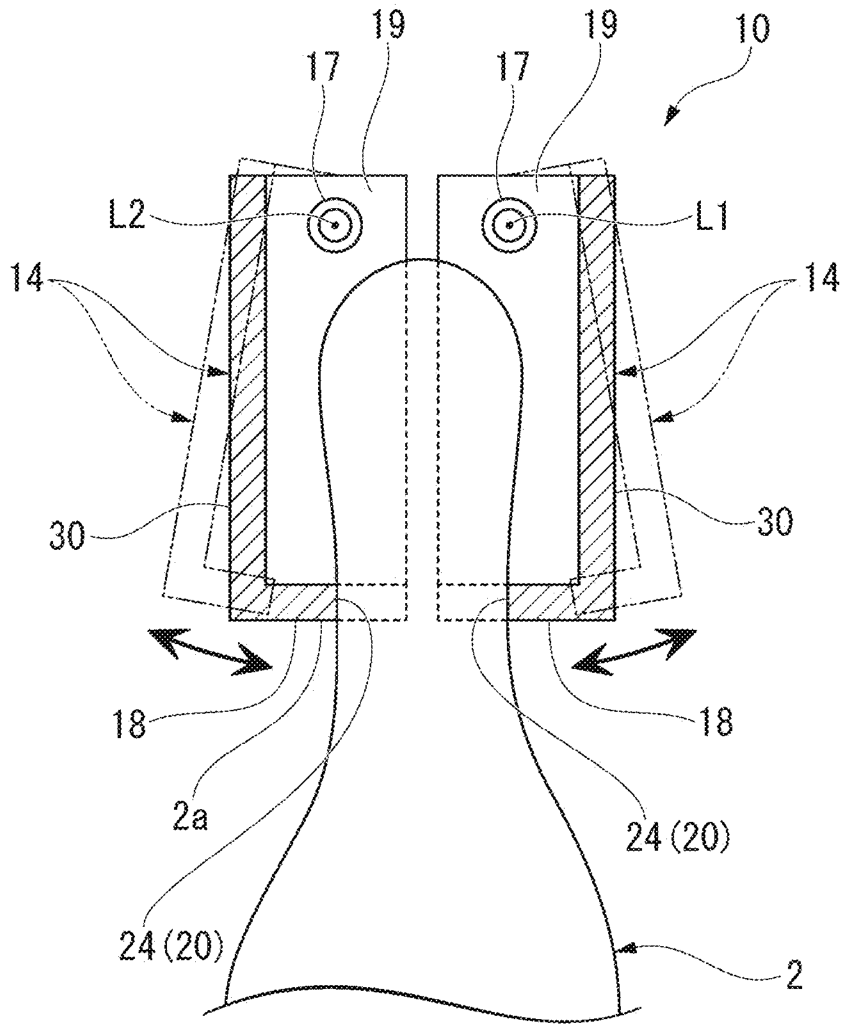
FIG. 5 is a cross-sectional view of the device for clamping bone-in meat of the first embodiment along line V-V in FIG. 1.

FIG. 1 is a side view of a device 10 for clamping bone-in meat (hereinafter, referred to as "a clamping device 10") of an embodiment. FIG. 2 is a view when seen from an arrow II in FIG. 1, and FIG. 3 is a view when seen from an arrow III in FIG. 1. In addition, FIG. 4 is an exploded perspective view of a part of the clamping device 10, and FIG. 5 is a cross-sectional view along line V-V in FIG. 1.

In the embodiment, chicken leg meat is treated as bone-in meat 2. However, the treated bone-in meat 2 is not limited to the chicken leg meat, but may also be the legs of a pig, etc.

In the chicken leg meat (the bone-in meat 2), a femur b1 and a tibia b2 are connected by a knee joint b3, and an ankle b4 is connected to an end portion of the tibia b2. A bone section b is thinnest near the connecting section between the tibia b2 and the ankle b4, and the outer diameter of the ankle b4 thickens from the vicinity of the connecting section toward the terminal part.

The clamping device 10 is attached to a lifting device 12 and vertically raised and lowered together with the lifting device 12. In addition, the lifting device 12 is supported by a conveyance device (not shown) and moves between a plurality of processing stations by the operation of the conveyance device. The clamping device 10 holds the ankle b4 of the bone-in meat 2 upward and grips the outer circumferential surface near the ankle b4, thereby suspending and supporting the bone-in meat 2.

The clamping device 10 includes a base plate 13 connected to the lifting device 12, a pair of gripping blocks 14 pivotably supported on the base plate 13, a displacement restricting block 15 (displacement restricting part) configured to restrict displacement of the pair of gripping blocks 14, which are gripping the ankle b4 of the bone-in meat 2, in a separating direction (opening direction), and a fall-out regulation lever 16 configured to restrict fall-out of the ankle b4 of the bone-in meat 2 of the gripping blocks 14.

The base plate 13 has a substantially rectangular shape when viewed from the front and protrudes vertically downward from a lower end of the lifting device 12. A pair of pivot shafts 17 are attached near the lower end of the base plate 13 while being spaced apart in a widthwise direction. The pair of pivot shafts 17 protrude toward one side of the base plate 13 in a plate thickness direction, and the upper end portions of each of the gripping blocks 14 are pivotably supported on the protruded portions.

The gripping blocks 14 include substantially rectangular plate parts 18 (clamping parts) that are long in one direction, plate-like arm parts 19 that extend from one end portion in the longitudinal direction of the plate parts 18 in a direction perpendicular to the longitudinal direction, and side covers 30 configured to cover the outside of the space part sandwiched between the plate parts 18 and the arm parts 19. Extension ends of the arm parts 19 of the gripping blocks 14 are pivotably supported on the pivot shafts 17 correspondingly protruding from the base plate 13. The pivot shafts 17 penetrate the arm parts 19 in the plate thickness direction.

The one gripping block 14 and the other gripping block 14 face each other at the side edge portions of the plate parts 18 in the longitudinal direction. Here, if the opposing sides of the pair of plate parts 18 are referred to as inner sides, inner side edge portions of the plate parts 18 have concave portions 20, which hold the outer circumferential surface of the bone-in meat 2 near the ankle b4. The pair of plate parts 18 grips the outer circumferential surface near the ankle b4 in a substantially horizontal posture, with the corresponding arm parts 19 supported by the pivot shafts 17. The arm parts 19 can pivot around pivoting axes L1 and L2, which are center axes of the corresponding pivot shafts 17, respectively.

Further, in the embodiment, the concave portions 20 constitute grip parts in the gripping blocks 14. In addition, the arm parts 19 of the gripping blocks 14 extend upward relative to the plate parts 18, which are in a substantially horizontal posture, respectively.

The pair of gripping blocks 14 pivot about the pivoting axes L1 and L2 at the upper end of the arm parts 19, thereby relatively displacing the inner side edge portions (the concave portions 20) of the plate parts 18 so as to approach and separate. Accordingly, the pair of gripping blocks 14 are arranged so that their gripping parts (the concave portions 20) can be relatively displaced in a direction in which they approach and separate from each other.

Cylindrical guide protrusions 21 extending parallel to the pivoting axes L1 and L2 are provided on the midway portion of the arm parts 19 in the extension direction of the gripping blocks 14 (a position lower than the pivot shafts 17), respectively. Each of the guide protrusions 21 protrudes substantially perpendicular to the extension direction of the arm parts 19 on the surface of the arm parts 19 which is opposite the side to which the plate parts 18 extend.

The displacement restricting block 15 is constituted by a substantially rectangular plate-shaped block with a sufficient thickness and high rigidity, and its upper end portion is supported on the lower end of the lifting device 12 so that it can be raised and lowered. The displacement restricting block 15 is arranged substantially parallel to the base plate 13 on the outside of the base plate 13 (the side of the base plate 13 that is separated from the gripping blocks 14 while being sandwiched). As shown in FIG. 2 and FIG. 4, the displacement restricting block 15 is formed with a substantially U-shaped displacement restricting groove 22 that opens downward. The displacement restricting groove 22 penetrates the displacement restricting block 15 in the plate thickness direction, and is formed so that the groove width gradually narrows from the lower end toward the upper side. The inner surface of the displacement restricting groove 22 is capable of abutting against the outer circumferential surfaces of the two guide protrusions 21 protruding from the pair of gripping blocks 14.

Here, the displacement restricting block 15 is biased downward by a biasing member 31 such as a coil spring or the like. In other words, the displacement restricting block 15 is biased by the biasing member 31 in a direction in which a side (upper end side) of the displacement restricting groove 22, a groove width of which narrows, approaches the two guide protrusions 21. The substantially U-shaped displacement restricting groove 22 of the displacement restricting block 15 is pressed against the outer circumferential surface of the two guide protrusions 21 by the biasing force of the biasing member 31. The two guide protrusions 21 are thus subjected to a pressing force in the direction in which they approach each other. As a result, the pair of gripping blocks 14 pivot about the pivoting axes L1 and L2 so that the inner side edge portions (the concave portions 20) of the plate parts 18 are adjacent to one another. Here, when the vicinity of the ankle b4 of the bone-in meat 2 is disposed between the concave portions 20 of the two plate parts 18, the outer circumferential surface of the bone-in meat 2 near the ankle b4 is gripped by the two concave portions 20.

In addition, as shown in FIG. 3, the inner side edge portions of the plate parts 18 of the gripping blocks 14 are provided with the concave portions 20, and excess meat clamping parts 23 constituted by flat surfaces extending in a direction substantially perpendicular to an approaching/separating direction of the plate parts 18 (the concave portions 20). The excess meat clamping parts 23 are provided near one side of the concave portions 20 (sides continuous with the arm parts 19) in the inner side edge portions of the plate parts 18. When the two plate parts 18 are in a substantially horizontal posture, the excess meat clamping parts 23 face each other with their flat surfaces parallel to each other. When the outer circumferential surface of the bone-in meat 2 is gripped by the concave portions 20 of both the plate parts 18, the excess meat clamping parts 23 of the two plate parts 18 clamp excess meat sm (including the surface skin, etc.) of its outer circumference from both sides with their flat surfaces.

Further, the arm parts 19 of each of the gripping blocks 14 extend upward from the end portion of the plate parts 18 on the side where the excess meat clamping parts 23 are located. Accordingly, the two gripping blocks 14 are supported by the pivot shafts 17 in a cantilevered manner on the side where the excess meat clamping parts 23 are located.

In addition, the concave portions 20 of the plate parts 18 have substantially arc-shaped receiving parts 24 configured to receive the outer circumferential surface of the bone-in meat 2 at a position adjacent to the excess meat clamping parts 23, and tapered portions 25 inclined from the side separated from the excess meat clamping parts 23 toward the deepest portion of the concave portion. When the outer circumferential surface of the bone-in meat 2 is clamped between both the plate parts 18, the tapered portions 25 presses the excess meat sm of the outer circumference of the bone section b in the direction of the excess meat clamping parts 23.

Further, reference sign 33 in FIG. 3 is a guide slope for guiding the bone section b (near the ankle b4) of the bone-in meat 2 between the plate parts 18 when the bone section b is gripped between the plate parts 18.

In addition, the fall-out regulation lever 16 shown in FIG. 1 includes a substantially L-shaped lever main body 35 pivotably supported on the lifting device 12, and a pressing roller 36 rotatably supported on one end portion of the lever main body 35. The lever main body 35 is pivotably biased by a biasing member (not shown) in a direction in which an end portion on the side of the pressing roller 36 approaches the gripping blocks 14. When the bone-in meat 2 is gripped between the pair of gripping blocks 14, if the outer circumferential surface of the pressing roller 36 abuts against the outer circumferential surface of the end portion of the bone section b of the bone-in meat 2, the biasing force of the biasing member prevents the bone-in meat 2 from falling out and maintains a constant grip posture of the bone-in meat 2.

As described above, the clamping device 10 of the embodiment includes the pair of (plurality of) gripping blocks 14 configured to adjust a separating distance of the concave portions 20 (grip part), and the displacement restricting block 15 (displacement restricting part) configured to restrict displacement of the pair of (plurality of) gripping blocks 14 in the separating direction. Accordingly, when the clamping device 10 of the embodiment is employed, even if there is variation in the thickness of the end portion of the bone section b of the bone-in meat 2, the bone-in meat 2 can be gripped reliably.

In addition, in the clamping device 10 of the embodiment, the gripping blocks 14 have the plate parts 18 and the arm parts 19, the grip parts (the concave portions 20) are provided on the inner side edge portions of the plate parts 18, and the pair of plate parts 18 hold the outer circumferential surface of the bone-in meat 2 in a substantially horizontal posture. Then, the arm parts 19 are pivotably supported about the pivoting axes L1 and L2, allowing the two plate parts 18 to be displaced in approaching and separating directions. For this reason, when the bone section b of the bone-in meat 2 is gripped by the gripping blocks 14, the two plate parts 18 move away from each other and the inclination of each of the plate parts 18 increases. As a result, it is possible to enlarge the receiving space of the bone section b at upper side of the two plate parts 18 and easily set one end side of the bone section b between the two plate parts 18.

In addition, when the two plate parts 18 are displaced in the approaching direction, since the two plate parts 18 are in a substantially horizontal posture, the grip parts (the concave portions 20) of the plate parts 18 can firmly grip one end side of the bone section b.

In the embodiment, although the arm parts 19 of the two gripping blocks 14 are capable of pivoting about the pivoting axes L1 and L2, it is also possible for only one of the arm parts 19 of the two gripping blocks 14 to be capable of pivoting about the pivoting axis.

However, in the case in which the arm parts 19 of the two gripping blocks 14 are each capable of pivoting about the pivoting axes L1 and L2 as in this embodiment, the bone-in meat 2 can be easily set between the two plate parts 18 by tilting the two plate parts 18 in the same manner when gripping the bone-in meat 2. In addition, here, since the tilt angles of the pair of gripping blocks 14 (the plate parts 18) can be made almost equal, the bone-in meat 2 can be supported by the two gripping blocks 14 in a well-balanced manner.

In addition, in the clamping device 10 of the embodiment, the guide protrusions 21 extending parallel with the pivoting axes L1 and L2 are provided on each of the arm parts 19 of the pair of gripping blocks 14, and the displacement restricting groove 22 that can abut the two guide protrusions 21 is provided on the displacement restricting block 15. Then, the displacement restricting block 15 is arranged so as to be displaceable in a direction along the displacement restricting groove 22, and the groove width of the displacement restricting groove 22 is set so as to narrow toward one side.

Accordingly, when the configuration is employed, despite its simple structure, the bone section b of the bone-in meat 2 can be firmly gripped by the pair of gripping blocks 14 by pressing the displacement restricting grooves 22 of the displacement restricting block 15 against the two guide protrusions 21.

Further, in the clamping device 10 of the embodiment, the displacement restricting block 15 is biased by the biasing member 31 in a direction in which a side of the displacement restricting groove 22, a groove width of which narrows, approaches the two guide protrusions 21. For this reason, after the bone-in meat 2 is set between the pair of gripping blocks 14, the biasing force of the biasing member 31 allows the grip parts (the concave portions 20) of the gripping blocks 14 to be compressed against the outer circumferential surface of the bone-in meat 2 with a predetermined load.

Accordingly, when the configuration is employed, by simply releasing movement restriction of the displacement restricting block 15, the grip of the bone-in meat 2 can be made more stable while the grip state of the bone-in meat 2 by the pair of gripping blocks 14 can be automatically fixed.

In addition, in the clamping device 10 of the embodiment, since the grip parts of the gripping blocks 14 are constituted by the concave portions 20 provided in the side edge portions of the plate parts 18, the outer circumferential surface of the bone-in meat 2 can be stably supported by the concave portions 20.

In addition, in the clamping device 10 of the embodiment, the concave portions 20 of the plate parts 18 are provided with the receiving parts 24 configured to receive the outer circumferential surface of the bone-in meat 2, and the tapered portions 25 inclined from the side separated away from the receiving parts 24 toward the deepest portions of the concave portions 20. For this reason, when one end side of the bone-in meat 2 is set between the pair of plate parts 18 and the pair of plate parts 18 are displaced in the approaching direction in this state, the outer circumferential surface of the bone-in meat 2 is received by the receiving parts 24 of the concave portions 20 and receives a pressing force from the tapered portions 25 of the concave portions 20.

Accordingly, when the configuration is employed, the bone-in meat 2 gripped by the plate parts 18 can be stably supported by the tapered portions 25 and the receiving parts 24 in the concave portions 20.

Further, while the clamping device 10 of the above-mentioned embodiment has the pair of gripping blocks 14 whose grip parts (the concave portions 20) approach and separate from each other, the number of gripping blocks 14 is not limited to two and may be three or more. In this case, the three or more gripping blocks 14 form a structure that surrounds the outer circumferential surface of the bone-in meat 2 from the outside.

In addition, in the above-mentioned embodiment, while the concave portions 20 formed in the side edge portions of the plate parts 18 constitute the grip parts of the gripping blocks 14, the shape of the grip parts of the gripping blocks 14 is not limited to the concave portions 20. The grip parts may be flat or may have some unevenness in part as long as the grip parts can grip the outer circumferential surface of the bone-in meat 2.

In addition, in the above-mentioned embodiment, while the displacement restricting part configured to restrict displacement of the plurality of gripping blocks 14 in the separating direction is configured by the displacement restricting block 15 of the displacement restricting groove 22, the configuration of the displacement restricting part is not limited thereto. The displacement restricting part may be, for example, a multi-stage lock mechanism or an actuator that can restrict the displacement in the separating direction of the plurality of gripping blocks 14 at an arbitrary position.

Further, in the above-mentioned embodiment, as a means for approaching and separating the grip parts of the plurality of gripping blocks 14, the gripping blocks 14 are supported so as to be able to pivot freely on the pivot shafts 17, however, the means for approaching and separating the grip parts of the plurality of gripping blocks 14 is not limited to this. As the means for approaching and separating the grip parts of the plurality of gripping blocks 14, for example, it is also possible to use a mechanism in which the plurality of gripping blocks move linearly in a direction approaching and separating one another.

In addition, in the above-mentioned embodiment, although the plate parts 18 of the pair of gripping blocks 14 are structured to grip the end portion of the bone-in meat 2 in a substantially horizontal posture, the grip by the gripping blocks 14 on the end portion of the bone-in meat 2 is not necessarily limited to the grip in the substantially horizontal posture. For example, the gripping blocks 14 may grip the end portion of the bone-in meat 2 in an obliquely inclined or vertical posture.

Second Embodiment

Figure 6:
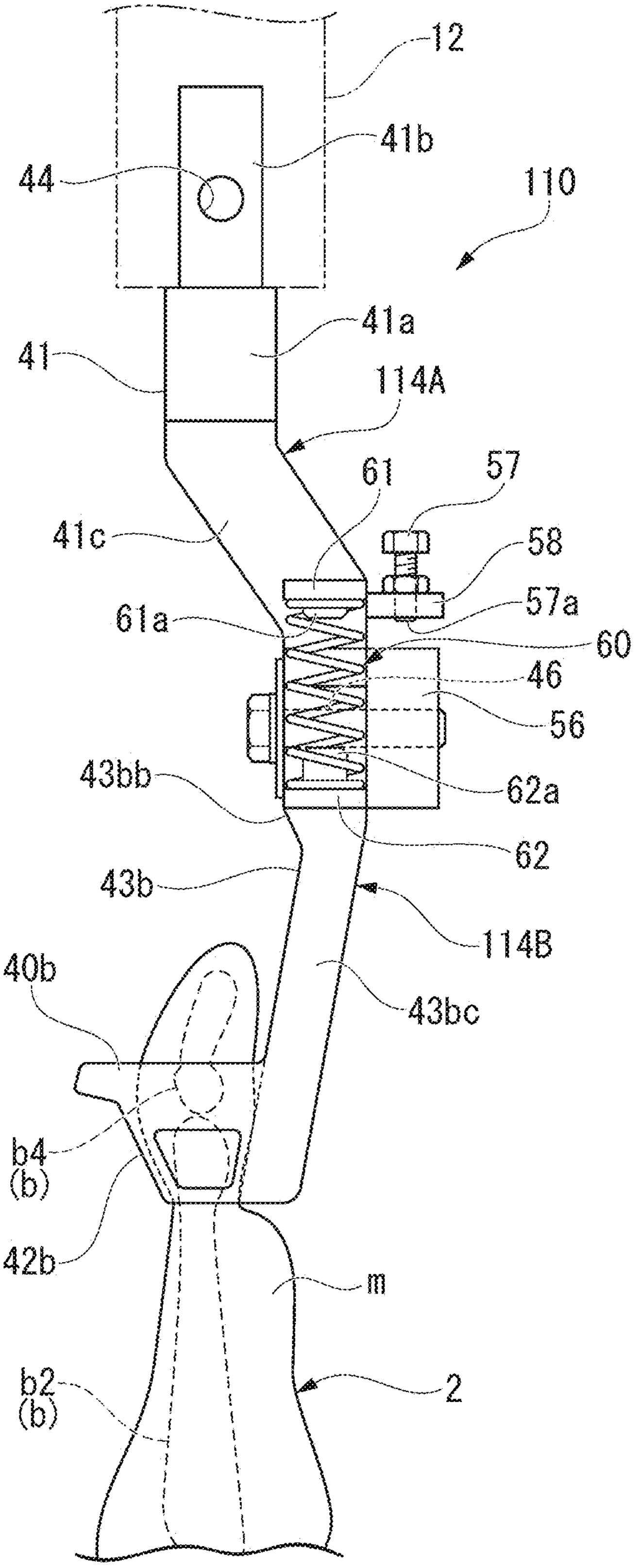
FIG. 6 is a side view of a device for clamping bone-in meat of a second embodiment.
Figure 7:
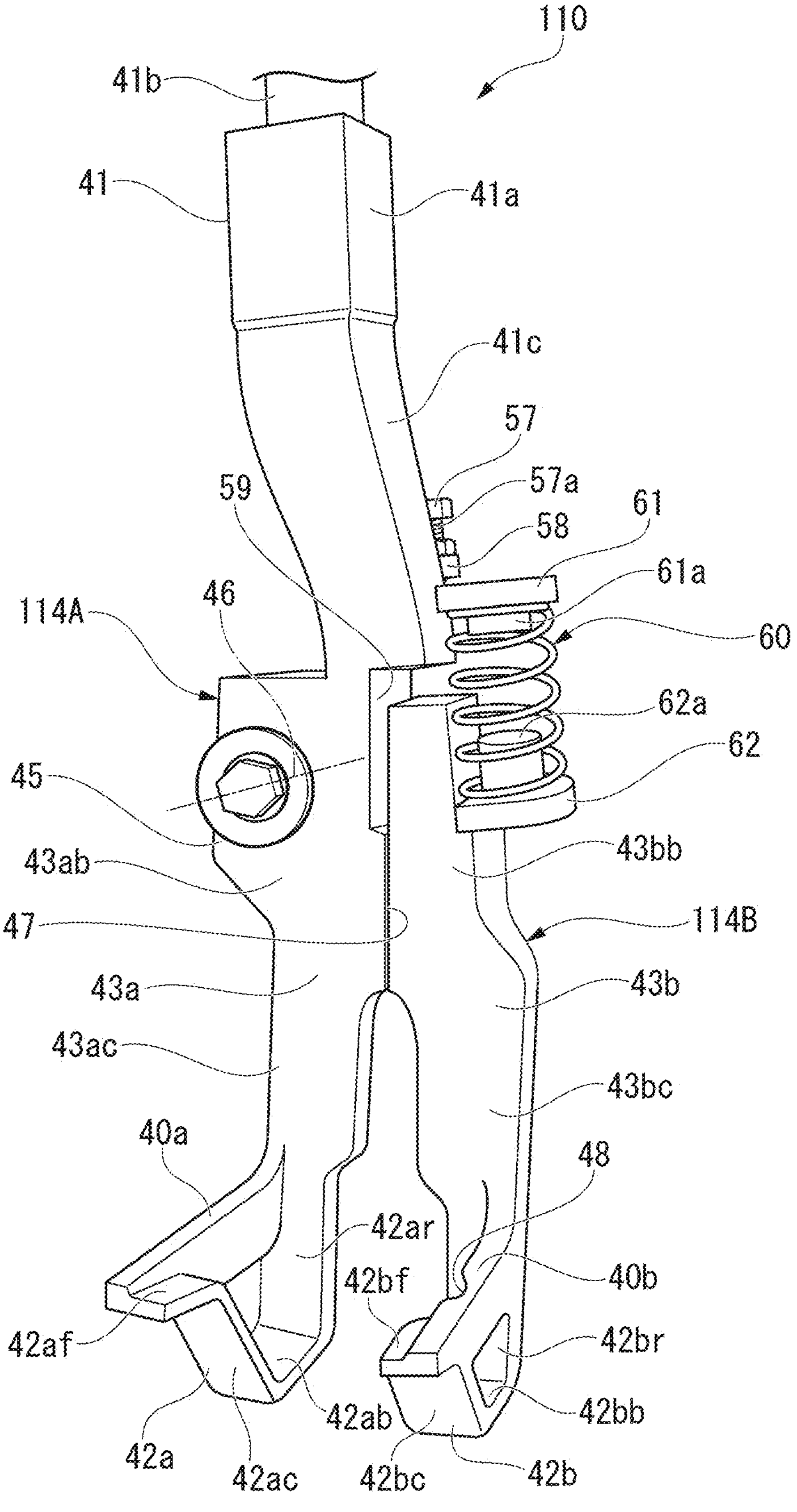
FIG. 7 is a perspective view of the device for clamping bone-in meat of the second embodiment.
Figure 8:
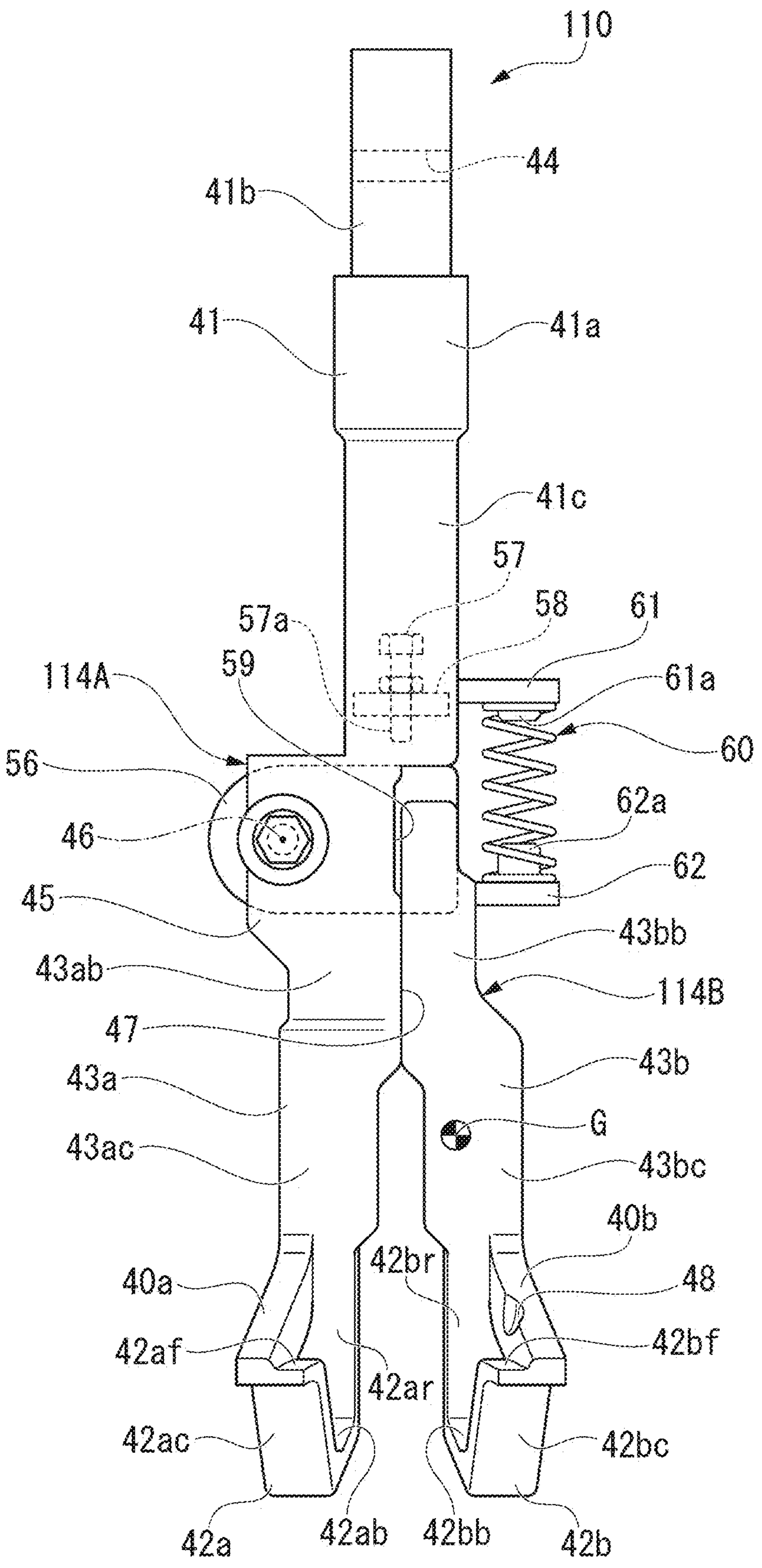
FIG. 8 is a front view of the device for clamping bone-in meat of the second embodiment.
Figure 9:
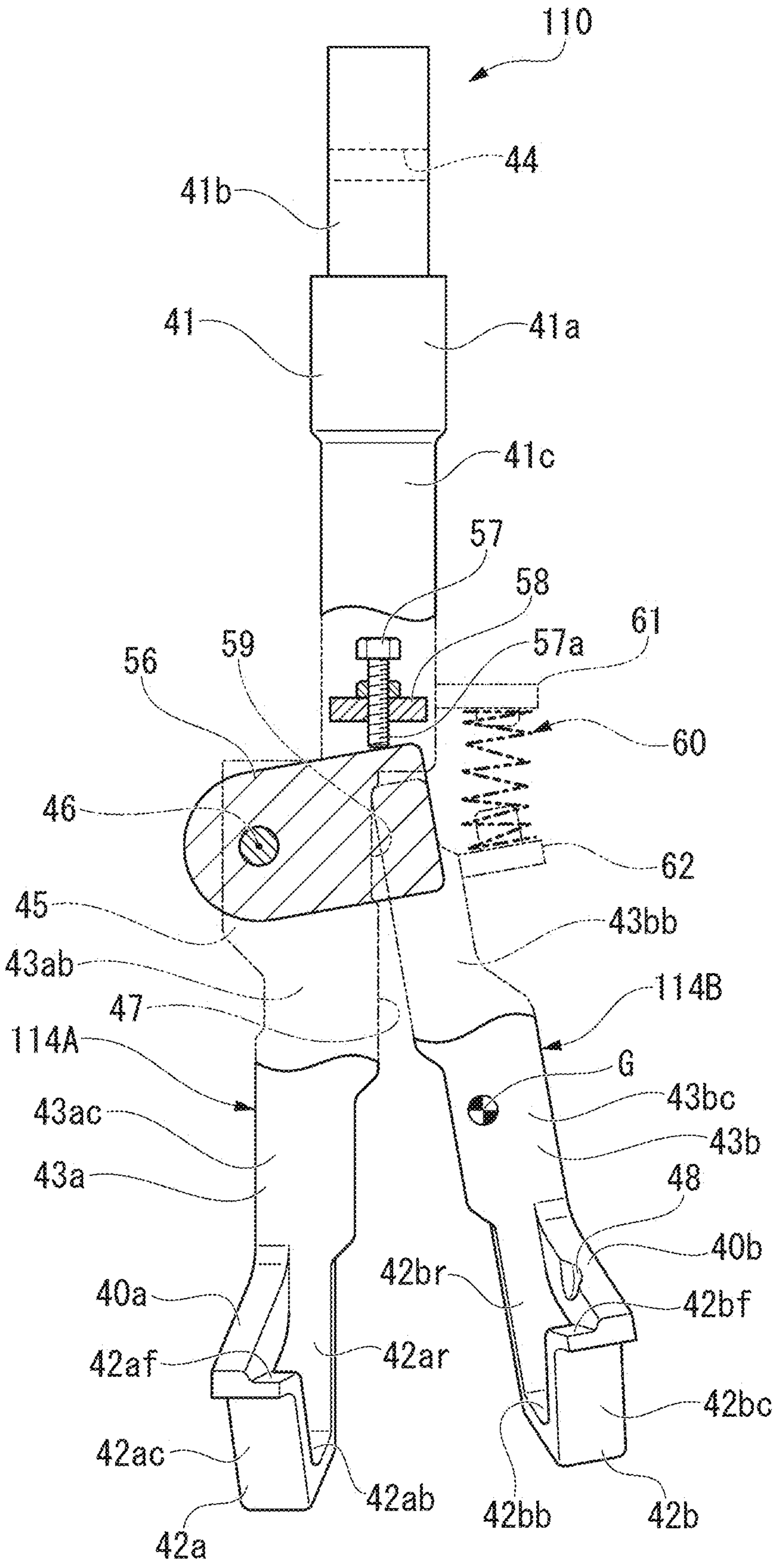
FIG. 9 is a front view of the device for clamping bone-in meat of the second embodiment, a part of which is cut away.

FIG. 6 is a side view of a device 110 for clamping bone-in meat (hereinafter, referred to as "a clamping device 110") of an embodiment. FIG. 7 is a perspective view of the clamping device 110, and FIG. 8 is a front view of the clamping device 110. In addition, FIG. 9 is a front view in which a part of the clamping device 110 is broken.

In FIG. 6 to FIG. 9, the same reference signs designate the parts common to those in the first embodiment described above. In the following description, descriptions of some parts that overlap with the first embodiment described above will be omitted.

The clamping device 110 is attached to the lifting device 12 and moves up and down together with the lifting device 12. The clamping device 110 holds the ankle b4 of the bone-in meat 2 upward and grips the outer circumferential surface near the ankle b4, thereby suspending and supporting the bone-in meat 2. The lifting device 12 is supported by a conveyance device (not shown) and is moved between the plurality of processing stations by operation of the conveyance device.

In the embodiment, the lifting device 12 constitutes external fixed equipment configured to fix the clamping device 110.

The clamping device 110 includes a first gripping block 114A and a second gripping block 114B having grip pieces 40*a* and 40*b* (grip part) that can abut the outer circumferential surface of the bone section b (the ankle b4) of the bone-in meat 2, and a block biasing member 60 configured to bias the second gripping block 114B in a direction in which the grip pieces 40*a* and 40*b* (grip parts) approach each other. The first gripping block 114A and the second gripping block 114B are capable of approaching and separating the grip pieces 40*a* and 40*b* (grip parts) from each other.

The first gripping block 114A includes a base part 41 fixed to a lower end of the lifting device 12, a clamping part 42*a* having the grip piece 40*a*, and an arm part 43*a* extending upward from the clamping part 42*a* and configured to connect the clamping part 42*a* and the base part 41.

The base part 41 includes a base part main body 41*a* which is a long rectangular prism extending in the upward/downward direction, a cylindrical rod portion 41*b* which protrudes upward from the upper surface of the base part main body 41*a*, and an inclined wall 41*c* which is prismatic (square prism-shaped) and extends diagonally downward in one direction from the lower end of the base part main body 41*a*. A fixing hole 44 is formed in the rod portion 41*b*, penetrating it in the diameter direction. A fixed shaft (not shown) configured to connect the base part 41 to the lifting device 12 can be inserted into the fixing hole 44.

Hereinafter, for the convenience of description, the side where the inclined wall 41*c* bends from the base part 41 is referred to as the "rear" side, and the opposite side is referred to as the "front" side. In addition, with respect to the clamping device 110, the side positioned to the right when facing the front is referred to as the "right" side, and the opposite side is referred to as the "left" side.

An upper end portion of the arm part 43*a* is connected to a right half area of the lower end of the prismatic inclined wall 41*c*. The arm part 43*a* includes an arm base portion 43*ab* extending downward vertically from a lower end of the inclined wall 41*c*, and an inclined extension portion 43*ac* extending obliquely forward and downward from a lower end of the arm base portion 43*ab*. The arm base portion 43*ab* has a side bulging area 45 bulging rightward from the inclined wall 41*c* of the base part 41. A pivot shaft 46 extending substantially horizontally in the forward/rearward direction is attached to the side bulging area 45. The pivot shaft 46 is formed by a shaft portion of the bolt that penetrates the side bulging area 45 in the forward/rearward direction. The pivot shaft 46 is pivotably supported on the side bulging area 45. The clamping part 42*a* is continuous with the lower end of the inclined extension portion 43*ac*.

In addition, a concave portion 59 configured to avoid interference with an arm base portion 43*b* of the second gripping block 114B when the second gripping block 114B is pivoted in the opening direction is formed in an upper area of a left side surface of the arm base portion 43*ab*. An area of the left side surface of the arm base portion 43*ab* below the concave portion 59 is defined as a closing restricting surface 47 against which the inner side surface of the arm base portion 43*bb* of the second gripping block 114B abuts when the second gripping block 114B is pivoted in a closing direction.

The clamping part 42*a* includes a rear inclined wall 42*ar* continuously extending forward and downward from the inclined extension portion 43*ac* of the arm part 43*a*, a bottom wall 42*ab* substantially horizontally extending forward from a lower end of the rear inclined wall 42*ar*, a front inclined wall 42*ac* obliquely extending forward and upward from a front end portion of the bottom wall 42*ab*, a front edge wall 42*af* extending forward from an upper end portion of the front inclined wall 42*ac*, and the grip piece 40*a* that connects the rear inclined wall 42*ar* and the front edge wall 42*af*. The rear inclined wall 42*ar*, the bottom wall 42*ab*, the front inclined wall 42*ac*, and the front edge wall 42*af* are formed to have substantially the same width in the leftward/rightward directions and to have the same thickness overall. The grip piece 40*a* is formed of a long plate-like piece whose thickness direction faces the leftward/rightward direction. Front and rear end portions of the grip piece 40*a* are continuous with right side edge portions of the front edge wall 42*af* and the rear inclined wall 42*ar*.

In addition, a rectangular plate-shaped support wall 58 protrudes rearward from the rear surface of the lower end area of the inclined wall 41*c*. A displacement restricting bolt 57 configured to restrict excessive pivot displacement of the second gripping block 114B is threadedly engaged with the support wall 58. The displacement restricting bolt 57 has a shaft portion 57*a* that penetrates the support wall 58 from above to below. The displacement restricting bolt 57 restricts the excessive pivot displacement of the second gripping block 114B by making the tip portion of the shaft portion 57*a* to abut an upper surface of a connecting arm 56 of the second gripping block 114B, which will be described below. The displacement restricting bolt 57 is able to freely adjust the pivot restricting position of the second gripping block 114B by adjusting the screw-threaded position of the shaft portion 57*a* through a pivoting operation.

The second gripping block 114B includes an arm part 43*b* disposed near a left side of the arm part 43*a* of the first gripping block 114A, the connecting arm 56 that is continuous with a rear surface of the arm part 43*b* and that is substantially horizontally extending from a rear position of the arm part 43*b* toward a right side (the side of the first gripping block 114A), and a clamping part 42*b* that has the grip piece 40*b* and that is continuous with a lower end of the arm part 43*b*.

The arm part 43*b* includes the prismatic arm base portion 43*bb* disposed below a substantially left half portion of an inclined wall 41 of the first gripping block 114A with a sufficient gap, and an inclined extension portion 43*bc* obliquely extending forward and downward from a lower end of the arm base portion 43*bb*.

The connecting arm 56 is connected to a rear surface of an upper area of the arm base portion 43*bb*, and extends to a position reaching a rear surface of the side bulging area 45 of the arm base portion 43*ab* of the first gripping block 114A. An extension end side portion of the connecting arm 56 is non-pivotally connected (capable of rotating together) to an end portion of the pivot shaft 46 (bolt shaft portion) supported on the side bulging area 45. The second gripping block 114B is supported on the second gripping block 114B so that it can pivot about the pivot shaft 46. The second gripping block 114B is pivotable about an axial center (pivoting axis) of the pivot shaft 46.

Further, in the embodiment, while the connecting arm 56 is constituted by an integrated member, the connecting arm 56 may be configured by connecting a plurality of members.

The clamping part 42*b* includes a rear inclined wall 42*br* continuously extending forward and rearward from the inclined extension portion 43*bc* of the arm part 43*b*, a bottom wall 42*bb* substantially horizontally extending forward from a lower end of the rear inclined wall 42*br*, a front inclined wall 42*bc* obliquely extending forward and upward from a front end portion of the bottom wall 42*bb*, a front edge wall 42*bf* extending forward from an upper end portion of the front inclined wall 42*bc*, and the grip piece 40*b* that connects the rear inclined wall 42*br* and the front edge wall 42*bf*. The rear inclined wall 42*br*, the bottom wall 42*bb*, the front inclined wall 42*bc*, and the front edge wall 42*bf* are formed to have substantially the same width in the leftward/rightward directions and to have the same thickness overall. The grip piece 40*b* is formed of a long plate-like piece whose thickness direction faces the leftward/rightward direction. Front and rear end portions of the grip piece 40*b* are continuous with left side edge portions of the front edge wall 42*bf* and the rear inclined wall 42*br*.

Further, a concave portion 48 configured to receive a part of the bone section b of the bone-in meat 2 is formed in an upper edge portion inside the grip piece 40*b* of the second gripping block 114B (a side facing the first gripping block 114A). In the embodiment, while the concave portion 48 is not formed in the grip piece 40*a* of the first gripping block 114A, the concave portion 48 may be similarly provided in the grip piece 40*a*.

The block biasing member 60 of the embodiment is constituted by a compression coil spring. An upper spring seat 61 protrudes from a left side surface of a lower end of the inclined wall 41*c* of the first gripping block 114A, and a lower spring seat 62 protrudes from a left side surface of the arm base portion 43*bb* of the second gripping block 114B. The upper spring seat 61 and the lower spring seat 62 face each other in the upward/downward direction when the grip pieces 40*a* and 40*b* are in a closed state with the interval between them being closest. The compression coil spring, which is the block biasing member 60, is interposed between the upper spring seat 61 and the lower spring seat 62. Further, a guide protrusion 61*a* configured to guide an upper end portion of the compression coil spring (the block biasing member 60) protrudes from a lower surface of the upper spring seat 61, and a guide protrusion 62*a* configured to guide a lower end portion of the compression coil spring (the block biasing member 60) protrudes from an upper surface of the lower spring seat 62.

As described above, the block biasing member 60 interposed between the upper spring seat 61 and the lower spring seat 62 is disposed on a side portion opposite to a side where the connecting arm 56 extends, in the arm base portion 43*bb* of the second gripping block 114B. The block biasing member 60 is disposed along a left side surface of the arm base portion 43*bb*. In addition, the block biasing member 60 (compression coil spring) interposed between the upper spring seat 61 and the lower spring seat 62 is disposed substantially in a tangential direction of a circle about a center axis of the pivot shaft 46.

In the embodiment, the block biasing member 60 constitutes a displacement restricting part configured to restrict displacement of the first gripping block 114A and the second gripping block 114B in the separating direction.

Here, as shown in FIG. 8 and FIG. 9, the center of gravity G of the second gripping block 114B is located far to the left of the center axis of the pivot shaft 46, near the lower end of the arm part 43*b*. For this reason, the weight of the second gripping block 114B acts at the position of the center of gravity G so that the grip piece 40*b* (grip part) of the second gripping block 114B pivots in a direction approaching the grip part of the first gripping block 114A. For this reason, as shown in FIG. 9, when the second gripping block 114B is opened in the direction in which the grip pieces 40*a* and 40*b* move away from each other, the second gripping block 114B is subjected to a moment in a closing direction due to its own weight in addition to the reaction force of the block biasing member 60.

As described above, the clamping device 110 of the embodiment includes the first gripping block 114A and the second gripping block 114B configured to adjust a separating distance of the grip pieces 40*a* and 40*b* (grip part), and the block biasing member 60 (displacement restricting part) configured to restrict displacement of the first gripping block 114A and the second gripping block 114B in the separating direction. Accordingly, when the clamping device 110 of the embodiment is employed, even if there is variation in the thickness of the end portion of the bone section b of the bone-in meat 2, the bone-in meat 2 can be gripped reliably.

In addition, the clamping device 110 of the embodiment includes the first gripping block 114A and the second gripping block 114B having the grip pieces 40*a* and 40*b* (grip parts), and the block biasing member 60 configured to bias the second gripping block 114B in the direction in which the grip pieces 40*a* and 40*b* approach each other. For this reason, when the interval between grip pieces 40*a* and 40*b* of the first gripping block 114A and the second gripping block 114B is expanded against the biasing force of the block biasing member 60, and the bone section b of the bone-in meat 2 is inserted between these grip pieces 40*a* and 40*b*, the biasing force of the block biasing member 60 increases in accordance with the increase in the opening amount of the grip pieces 40*a* and 40*b*, and the opening between the grip pieces 40*a* and 40*b* is restricted by the biasing force of the block biasing member 60. Accordingly, the clamping device 110 of the embodiment has a simple configuration and can reliably grip the bone-in meat 2 even when there is variation in thickness around the bone section b of the bone-in meat 2.

In addition, in the clamping device 110 of the embodiment, the first gripping block 114A can be fixed to the lifting device 12 (external fixed equipment), and the pivot shaft 46, which is substantially horizontal, configured to pivotably support the second gripping block 114B is provided on the first gripping block 114A. Then, the second gripping block 114B is supported on the pivot shaft 46 such that gravity is applied in a direction in which the grip piece 40*b* of the second gripping block 114B approaches the grip piece 40*a* of the first gripping block 114A. For this reason, when the bone-in meat 2 is gripped, if the second gripping block 114B is pivoted upward about the pivot shaft 46 on the side of the first gripping block 114A, the weight of the second gripping block 114B acts in a direction that brings the grip piece 40*b* of the second gripping block 114B closer to the grip piece 40*a* of the first gripping block 114A. Accordingly, when the interval between the grip pieces 40*a* and 40*b* of the first gripping block 114A and the second gripping block 114B is pressed and spread apart by the bone section b of the bone-in meat 2, in addition to the biasing force of the block biasing member 60, the weight of the second gripping block 114B is pressed against the bone section b of the bone-in meat 2.

Accordingly, when the configuration is employed, the bone section b of the bone-in meat 2 can be more strongly gripped by the first gripping block 114A and the second gripping block 114B.

Further, in the clamping device 110 of the embodiment, the connecting arm 56 substantially horizontally extending toward the first gripping block 114A is provided on the second gripping block 114B, and an extension end side of the connecting arm 56 is pivotably supported on the pivot shaft 46. In this case, since the connecting arm 56 substantially horizontally extending toward the pivot shaft 46 is provided on the second gripping block 114B, the weight of the second gripping block 114B acting at the center of gravity G acts as a large moment to rotate the second gripping block 114B in the gripping direction.

Accordingly, when the configuration is employed, the bone section b of the bone-in meat 2 can be more strongly gripped by the first gripping block 114A and the second gripping block 114B.

In addition, in the clamping device 110 of the embodiment, the block biasing member 60, which biases the second gripping block 114B to pivot, is disposed on the side of the second gripping block 114B which is an opposite side of the second gripping block 114B where the connecting arm 56 is extending. In this case, since the block biasing member 60 or the lower spring seat 62 is positioned farther from the pivot shaft 46, their weights act as a larger moment to rotate the second gripping block 114B in the gripping direction.

Accordingly, when the configuration is employed, while preventing the block biasing member 60 from becoming too large, the grip pieces 40*a* and 40*b* of the first gripping block 114A and the second gripping block 114B can more firmly fix the bone section b of the bone-in meat 2.

In addition, in the clamping device 110 of the embodiment, the block biasing member 60 is constituted by the compression coil spring, and the compression coil spring is disposed substantially in the tangential direction of the circle about the center axis of the pivot shaft 46. In this case, the biasing force (spring reaction force) of the compression coil spring (the block biasing member 60) can be applied efficiently around the pivot shaft 46. In addition, when the bone section b of the bone-in meat 2 is gripped, since the reaction force of the block biasing member 60 (compression coil spring) acts as a compressive load with respect to the bone section b, the block biasing member 60 is no longer subjected to the load in a fracture direction. For this reason, durability of the block biasing member 60 is further improved.

Further, in the case of the embodiment, since the block biasing member 60 is disposed along the side of the second gripping block 114B which is opposite side of the second gripping block 114B where the connecting arm 56 is extending (a left side surface of the arm base portion 43*bb*), the entire clamping device 110 can be made more compact.

In the above-mentioned embodiment, the first gripping block 114A can be fixed to the external fixed equipment (the lifting device 12), and the second gripping block 114B is pivotably supported on the pivot shaft 46 on the side of the first gripping block 114A. However, a support structure of the first gripping block and the second gripping block is not limited thereto. For example, a base member that can be fixed to the external fixed equipment may be provided, and the first gripping block and the second gripping block may be pivotably supported on the base member. In this case, the biasing force of the block biasing member acts on the first and second gripping blocks so as to move the grip pieces (grip parts) toward each other.

Further, the present invention is not limited to the above-mentioned embodiments, and various design modifications are possible without departing from the scope of the present invention.

REFERENCE SIGNS LIST

- 2 Bone-in meat
- 2*f* Outer circumferential surface
- 10 Clamping device
- 12 Lifting device (external fixed equipment)
- 14 Gripping block
- 15 Displacement restricting block (displacement restricting part)
- 18 Plate part (clamping part)
- 19 Arm part
- 20 Concave portion (grip part)
- 21 Guide protrusion
- 22 Displacement restricting groove
- 24 Receiving part
- 25 Tapered portion
- 31 Biasing member
- 40*a*, 40*b* Grip piece (grip part)
- 46 Pivot shaft
- 56 Connecting arm
- 60 Block biasing member (displacement restricting part)
- 110 Clamping device
- 114A First gripping block (gripping block)
- 114B Second gripping block (gripping block)
- b Bone section
- m Meat section
- L1, L2 Pivoting axis

The invention claimed is:

1. A device for clamping bone-in meat comprising:
a pair of gripping blocks each including:
a substantially rectangular plate, wherein
an inner side edge portion of the substantially rectangular plate of one of the pair of gripping blocks faces an inner side edge portion of the substantially rectangular plate of the other of the pair of gripping blocks, the inner side edge portions each having a concave portion that abuts an outer circumferential surface around a bone section of the bone-in meat, the concave portions move in a direction in which the concave portions approach and separate from each other, and the substantially rectangular plates clamp the outer circumferential surface of the bone-in meat in a substantially horizontal posture;

a plate-like arm extending upward from the substantially rectangular plates, wherein one or more of the plate-like arms pivot about a pivoting axis such that the concave portions approach and separate from each other; and a guide protrusion disposed on each of the plate-like arms and extending parallel to the pivoting axis; and a displacement restricting block having a substantially U-shaped displacement restricting groove that opens downward, wherein the displacement restricting block moves upward and downward relative to the guide protrusions, the substantially U-shaped displacement restricting groove has an inner surface that abuts outer circumferential surfaces of the guide protrusions, a groove width of the substantially U-shaped displacement restricting groove narrows from a lower end of the substantially U-shaped displacement restricting groove toward an upper side of the substantially U-shaped displacement restricting groove, and when the inner surface of the substantially U-shaped displacement restricting groove abuts the outer circumferential surfaces of the guide protrusions, the displacement restricting block restricts displacement of the pair of gripping blocks gripping the bone-in meat in a separating direction.

2. The device according to claim 1, wherein each of the plate-like arms pivots about the pivoting axis.

3. The device according to claim 1 further comprising a coil spring that applies a downward force to the displacement restricting block such that the upper side of the substantially U-shaped displacement restricting groove approaches the guide protrusions.

4. The device according to claim 3, wherein concave portions each include:

a substantially arc-shaped wall surface that receives the outer circumferential surface of the bone-in meat; and a tapered wall surface inclined toward a deepest portion of the concave portion.

* * * * *